W. J. FRANCKE.
POWER TRANSMITTING DEVICE.
APPLICATION FILED JAN. 17, 1920.
1,398,773.
Patented Nov. 29, 1921.
4 SHEETS—SHEET 1.
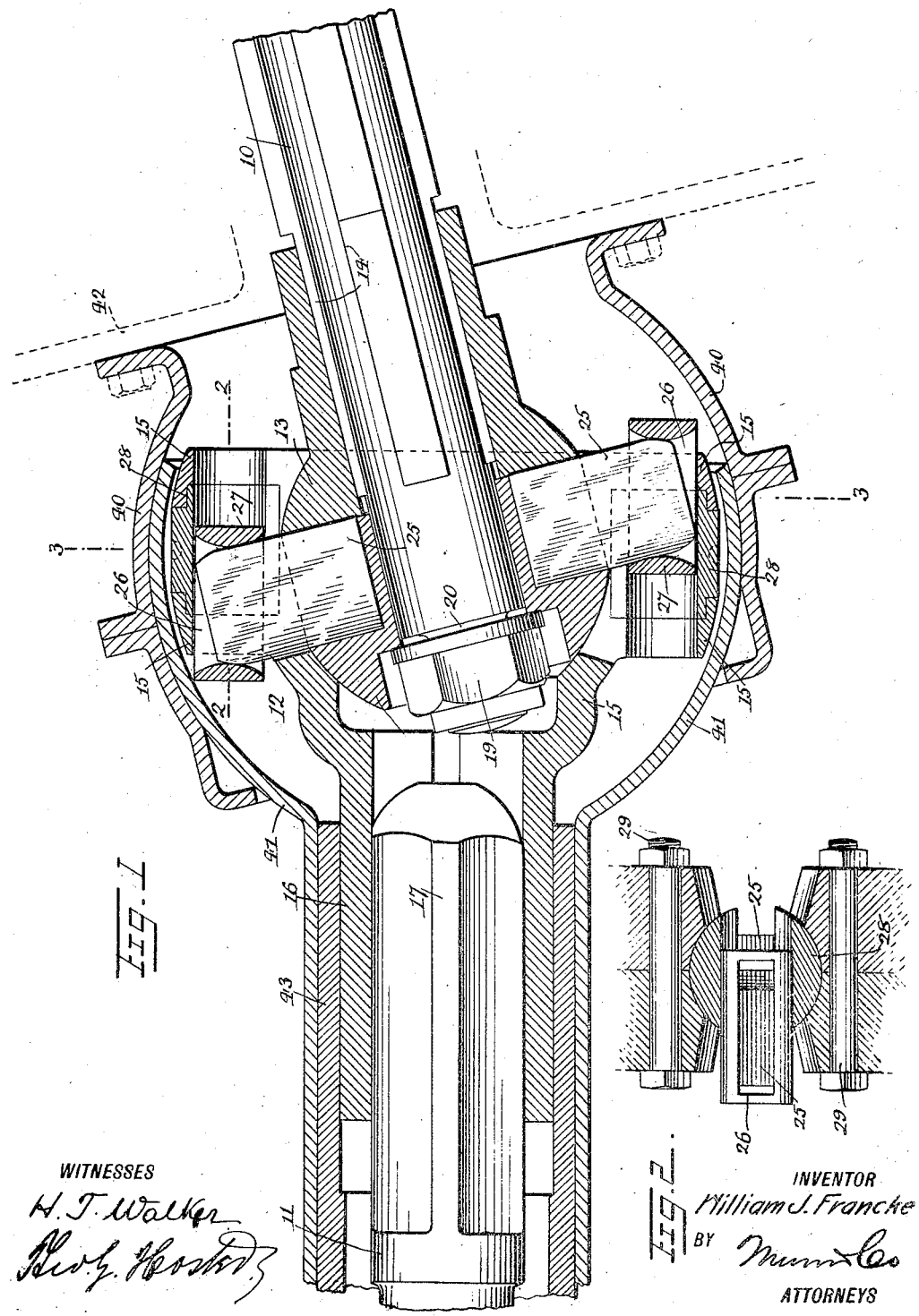
WITNESSES
H. J. Walker
INVENTOR
William J. Francke
BY
ATTORNEYS

W. J. FRANCKE.
POWER TRANSMITTING DEVICE.
APPLICATION FILED JAN. 17, 1920.

1,398,773.

Patented Nov. 29, 1921.

WITNESSES
H. T. Walker

INVENTOR
William J. Francke.
BY
ATTORNEYS

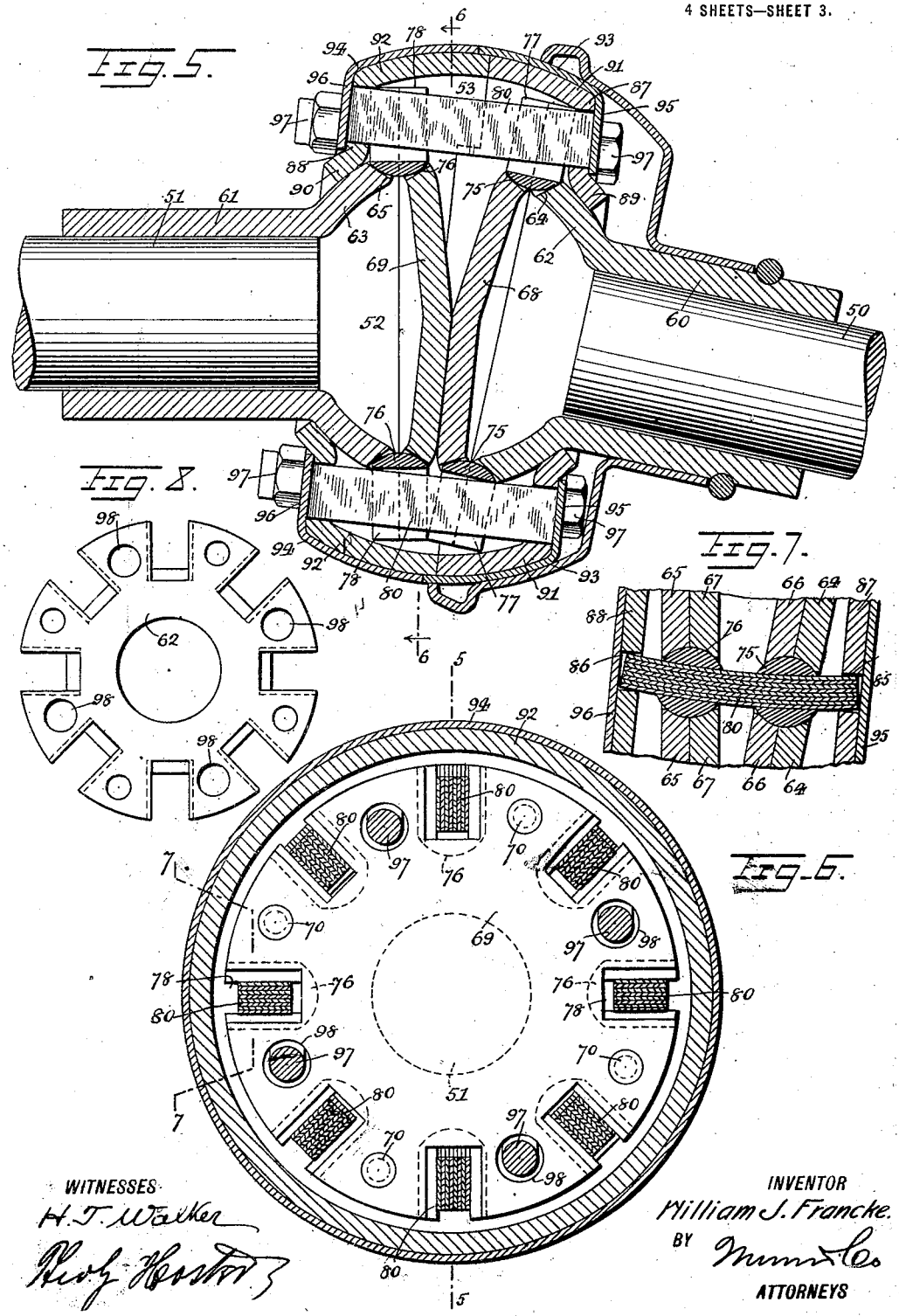

W. J. FRANCKE.
POWER TRANSMITTING DEVICE.
APPLICATION FILED JAN. 17, 1920.

1,398,773.

Patented Nov. 29, 1921.
4 SHEETS—SHEET 4.

WITNESSES
H. T. Walker

INVENTOR
William J. Francke.
BY
ATTORNEYS

UNITED STATES PATENT OFFICE.

WILLIAM J. FRANCKE, OF HIGHLAND PARK, NEW JERSEY, ASSIGNOR TO THE FRANCKE CO., OF HIGHLAND PARK, NEW JERSEY, A CORPORATION OF NEW JERSEY.

POWER-TRANSMITTING DEVICE.

1,398,773.

Specification of Letters Patent.   Patented Nov. 29, 1921.

Application filed January 17, 1920. Serial No. 352,175.

*To all whom it may concern:*

Be it known that I, WILLIAM J. FRANCKE, a citizen of the United States, and a resident of Highland Park, in the county of Middlesex and State of New Jersey, have invented a new and Improved Power-Transmitting Device, of which the following is a full, clear, and exact description.

The object of the invention is to provide a new and improved power transmitting device more especially designed for transmitting power by angularly disposed shafts.

Another object is to compensate for the non-circular path and the irregular angular advance of one coupling member relative to the other coupling member to insure a continuous regular driving of the driven transmission shaft from a uniformly driven driving or motor shaft.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a longitudinal central section of the power transmitting device;

Fig. 2 is a sectional plan view of part of the same on the line 2—2 of Fig. 1;

Fig. 5 is a longitudinal central section of a modified form of the power transmitting device on the line 5—5 of Fig. 6;

Fig. 6 is a cross section of the same on the line 6—6 of Fig. 5;

Fig. 7 is a sectional side elevation of a portion of the same on the line 7—7 of Fig. 6;

Fig. 8 is a reduced face view of one of the coupling disks of the ball and socket joint.

Figure 3:
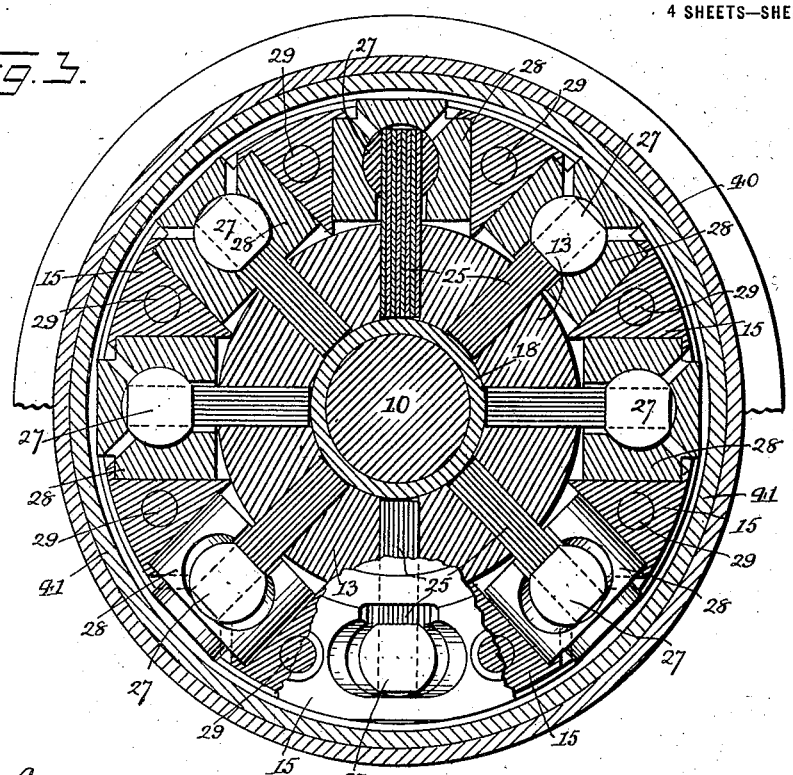
Fig. 3 is a transverse section of the same on the line 3—3 of Fig. 1.

When connecting two angularly disposed shafts by a ball and socket joint or other universal coupling, one of the joint members travels in a non-circular path relative to the other joint member, and an irregular angular advance takes place in one joint member relative to the other thus producing an irregular transmission of power and a loss of power. With the improvements presently described in detail, the above mentioned defects are compensated for to insure a continuous regular driving of the driven transmission shaft from a uniformly driven driving or motor shaft.

As illustrated in Fig. 1, the motor or driving shaft 10 and the driven shaft 11 are connected with each other by a universal joint 12, preferably of the ball and socket type, of which the ball 13 is fastened by keys 14 to the motor or driving shaft 10 and the socket 15 has its hub 16 slidingly connected with the polygonal end 17 of the driven shaft 11. A nut 19 screws on the reduced threaded inner end 20 of the motor shaft 10 and abuts against a shoulder 21 formed on the ball 13 to hold the latter against accidental longitudinal movement on the motor or driving shaft 10.

The ball and socket members 13 and 15 of the universal joint 12 are connected with each other by a flexible coupling to compensate for the non-circular path and the irregular angular advance of one coupling member relative to the other. This flexible coupling is arranged as follows: In the ball 13 of the universal joint 12 are held the inner ends of radially disposed bunches of flexible shims 25 having their outer or free ends extending into openings 26 formed in slides 27 mounted to slide sidewise in pivots 28 mounted to turn in the socket 15 with the axes of the pivots 28 disposed radially and hence at a right angle to the line of movement of the slides 27 in the said pivots. The side walls of the slides 27 are made convex, as plainly shown in Fig. 1, and the outer ends of the bunches of shims 25 have their corners rounded off to permit of an easy sliding movement of the slides 27 relative to the outer ends of the bunches of shims 25. From the foregoing it will be seen that by the arrangement described the joint members 13 and 15 of the universal coupling are movable one relative to the other on a common center, and the said members are flexibly connected with each other by the radially disposed bunches of shims 25, the slides 27 and the pivots 28.

In practice, the socket 15 is preferably made in two parts fastened together by bolts 29 to permit of conveniently assembling the members constituting the flexible coupling employed for connecting the ball 13 with the socket 15.

Figure 4:
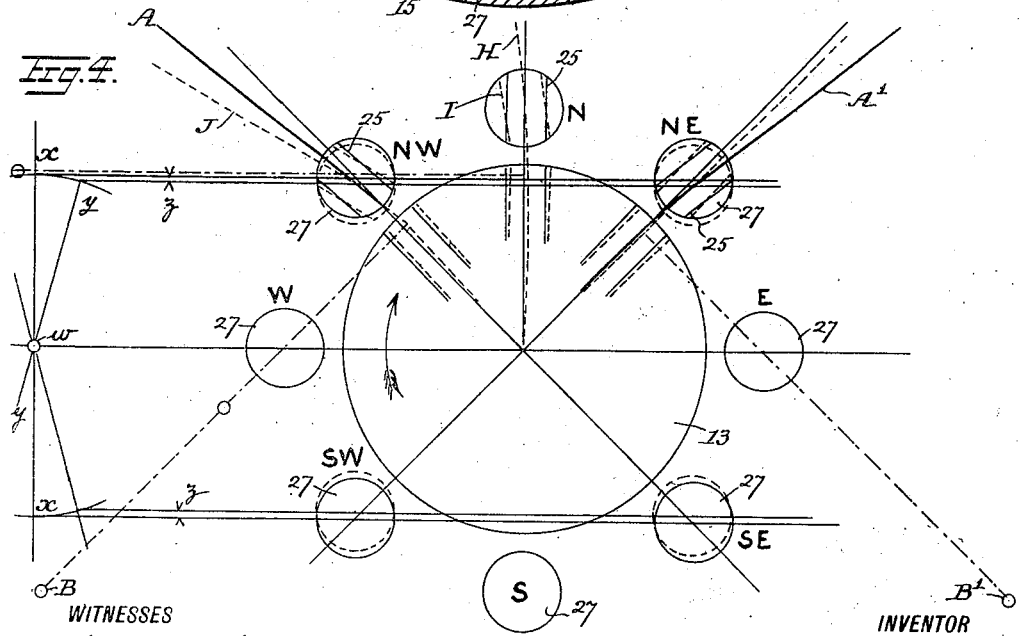
Fig. 4 is a diagrammatic view of the power transmitting device.

In order to protect the power transmitting device from dust and other extraneous matter use is made of a spherical hood formed of two parts 40 and 41, of which the part 40 is secured to the motor casing 42 while the other part 41 is preferably attached to a sleeve 43 held on the hub 16 of the socket member 15. By reference to the diagrammatic views shown in Fig. 4 and Fig. 4ª, it will be noticed that the non-circular or elliptical path of one coupling member relative to the other is compensated for and likewise the irregular angular advance of one coupling member relative to the other, and hence the driven shaft 11 receives a continuous regular, uniform driving from the motor or driving shaft 10. The explanation of this is as follows, special reference being had to Fig. 4: The vertical line $x$—$x$ represents the plane in which the driving shaft 10 revolves, and the line $y$—$y$ at an angle to and intersecting the line $x$—$x$ at the center W represents the plane in which the driven shaft 11 revolves, and it will be noticed that relative to the plane $x$—$x$ the periphery of the plane $y$—$y$ describes an ellipse. The value of the depression of the circle to form the ellipse is indicated at Z. It will be noted that the elliptical travel of the driven shaft 11 forces the slides 27 (shown in full lines in Fig. 4) to take the position shown by the broken lines and which position they can only assume on bending of the shims, and the amount of bending or deflection is shown by the full line A drawn from B as the center. The shims 25 in the two points below the center line at 45 degrees bend the same amount but in an opposite direction. When the shims 25 are in the position N (north), S (south), E (east) and W (west) then they remain unchanged by the angularity of the shafts 10 and 11, owing to the sliding action of the shims at the points N and S and the turning of the slides 27 at the points W and E. The bend in the shims 25 at the points NW and SE tends to move the socket member 12 forward in the direction of drive with relation to the ball member 13, and the bends in the shims 25 at the points SW and NE tend to move the socket member 12 backward and hence these forces balance each other. No angular change of rotative position of one coupling member 13 relative to the other member 15 is caused by the angularity of the shafts 10 and 11 nor by the ellipse caused by the angularity.

When the ball member 13 moves in the direction of the arrow to drive the socket member 15 then the shims 25 at the points N, S, E and W bend, as shown by the broken line H, and the slides 27 turn to adapt themselves correspondingly, as shown by the broken line I. The shims 25 at the points NW and SE bend, as shown by the broken line J, and the slides 27 turn to adapt themselves correspondingly, as indicated by the broken line I. The shims 25 at the points NW and SE bend, as shown by the broken line J, but the amount of the bend is double that at the points N, S, E and W because the shims 25 are clearly bent by the angularity of the shaft, and the driving power is also doubled at these two points. The bend of the shims 25 shown by the line A' at the points NE and SW straightens out and the driving power at these points becomes neutral.

The change in angular advance caused by the elliptical travel of the periphery of the coupling member 13 relative to the other coupling member 15 is compensated for at points N and S by sliding one of the shims 25, at points E and W by the turning of the slides 27 and at the four points NW, NE, SE and SW by the bending of the shims 25, it being understood that the bending above the center of the coupling is in an opposite direction to the bending below the center, the two forces balancing each other, thereby causing no change in the angular advance.

With a constant load the two coupling members 13 and 15 have a uniform angular advance and with a variable load the non-uniformity of the angular advance is limited to the amount of the bend of the shims 25 in transmitting the load.

Figure 9:
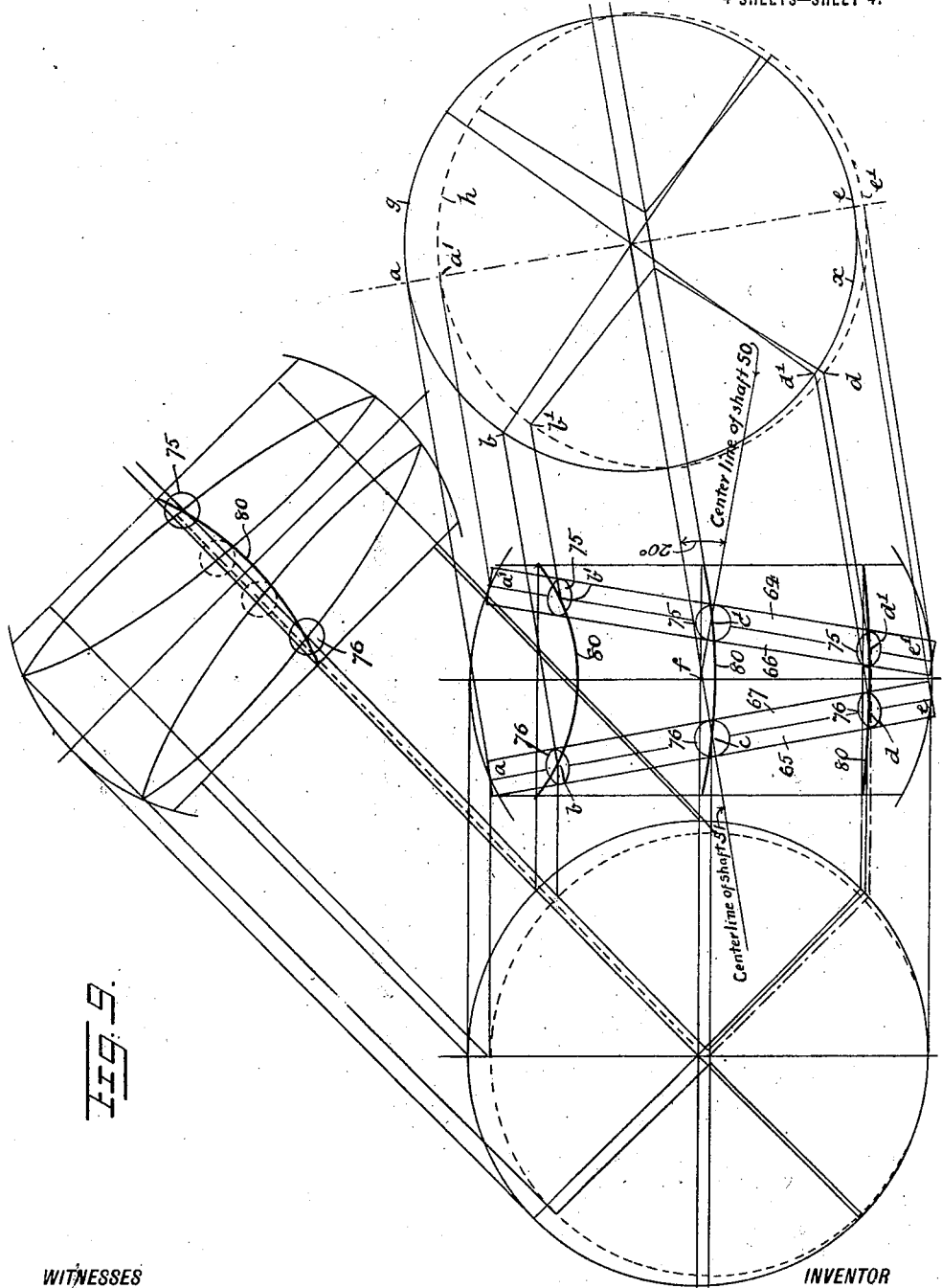
Fig. 9 is a diagrammatic view of the power transmitting device illustrated in Figs. 5, 6, 7 and 8.

In the modified form shown in Figs. 5 to 8, the motor or driving shaft 50 and the driven shaft 51 are connected with each other by a universal joint 52, the members of which are connected with each other by a flexible coupling 53 to compensate for the non-circular path and the irregular angular advance of one joint member relative to the other. The universal joint 52 is in the form of a ball and socket joint arranged as follows: On the adjacent ends of the shafts 50 and 51 are secured hubs 60, 61 of spherical or ball members 62, 63 having outwardly extending flanges 64, 65 to which are fastened the flanges 66, 67 of disks 68, 69 by the use of bolts 70 or other fastening means. In the flanges 64, 66 are mounted to turn radially disposed pivots 75 and similar pivots 76 are mounted to turn in the flanges 65, 67, and these pivots 75, 76 are arranged in oppositely disposed pairs and are provided with sidewise extending openings 77, 78 through which extends a flexible connecting member 80 in the form of a bunch of shims, as plainly shown in Figs. 5 and 7. The outer ends of each flexible connecting member 80 extend into openings 85, 86 formed in flanges 87, 88 extending outwardly from socket members 89, 90 fitting on the spherical or ball members 62, 63. The flanges 87, 88 of the socket members 89, 90 are provided with rims 91, 92 arranged in abutting relation and held in place by cap members 93, 94 having flanges 95, 96 fitting against the flanges 87, 88. Bolts 97 extend sidewise through the flanges 95, 87, 88, 96 to fasten the cap members 93, 94 in position with a view to hold the socket members 89 and 90 in place on the ball members 62, 63. The bolts 97 pass loosely through large openings 98 formed in the flanges 64, 66 and 65, 67 (see Figs. 6 and 8) to allow independent movement of the ball members 62, 63 in the socket members 89, 90. From the foregoing it will be seen that by the arrangement described the flexible connecting members 80 flexibly connect the ball members 62, 63 with the socket members 89, 90 thus compensating for the non-circular path of one point member relative to the other and likewise for the irregular angular advance of one joint member relative to the other. The explanation of this is as follows, special reference being had to Fig. 9:

At the points $a$, $a'$ and $e$, $e'$ the shims 80 are straight and not bent, due to the angle of the shafts 50 and 51, because the shims 80 are held at each end in the housing formed by the socket members 89 and 90 and the flanges 64, 66 and 65, 67 are close to the housing and hence the shims are not liable to bend. Both the housing and the two flanges turn on the center $f$ due to the ball and socket construction, and this forces the shims 80 at the points $b$, $b'$; $c$, $c'$, $d$, $d'$ to bend in the directions shown. The periphery of the flanges 65, 67 describes the circle $g$. With reference to the flanges 65, 67 the flanges 64, 66 describe the ellipse $h$. While the point $e$ moves to $d$, the point $b$ moves to $a$ where the shims 80 are straight and hence the angular advance for the distance traveled is uniform, but while the point $e$ moved to $d'$ on the line $x$, the point $e'$ moved only to $d$ on the dotted line of the ellipse $h$ with the shims 80 connecting at points $d$, $d'$, bending to compensate for the shorter line of the ellipse with the angular advance remaining constant. In a like manner, the shims 80 connecting the points $c$, $c'$ and $b$, $b'$ bend to compensate for the shorter peripheral travel, and during the second half of the revolution bend for the longer peripheral travel. In the diagram the bend of the shims at $b$, $b'$ appears greater than it is, due to being projected from the 45° angle position. The true bend of this bunch of shims 80 is shown in the projection at the top of the diagram.

Having thus described my invention, I claim as new and desire to secure by Letters Patent:

1. A power transmitting device, comprising a universal joint having joint members movable one upon the other on a common center, a flexible coupling member carried by one of the joint members, and pivotally mounted means carried by the other joint member and connected with the flexible member so as to bend the latter.

2. A power transmitting device, comprising a driving shaft, a driven shaft at an angle to the driving shaft, a ball and socket joint connecting the adjacent ends of the said shafts, a flexible member carried by one of the parts of the said joint, pivotally mounted means carried by the other part of the joint, and means for connecting the pivotally mounted means with the flexible member so as to bend the latter.

3. A power transmitting device, comprising a universal joint having joint members movable one on the other on a common center, a radially disposed flexible coupling member secured at one end in one of the joint members, a slide engaged by the free end of the said flexible coupling member, and a pivot mounted to turn in the other joint member and in which the said slide is movably mounted.

4. A power transmitting device, comprising a universal joint having joint members movable one on the other on a common center, a radially disposed flexible coupling member secured at one end in one of the joint members, a slide engaged by the free end of the said coupling member, and a pivot mounted to turn in the other joint member and in which the said slide is movably mounted, the said pivot having its axis disposed radially and at a right angle to the movement of the said slide in the pivot.

5. A power transmitting device, comprising a driving shaft, a driven shaft at an angle to the said driving shaft, a ball and socket joint connecting the adjacent ends of the said shafts with each other, a flexible coupling member disposed radially and having its inner end secured in the ball of the said joint, a pivot mounted to turn in the said socket member of the joint and having its axis disposed radially, and a slide mounted to slide in the said pivot at an angle to the axis thereof, the said slide being engaged by the outer end of the said flexible coupling member.

6. A power transmitting device, comprising a driving shaft, a driven shaft at an angle to the said driving shaft, a ball and socket joint connecting the adjacent ends of the said shafts with each other, a flexible coupling member disposed radially and having its inner end secured in the ball of the said joint, a pivot mounted to turn in the said socket member of the joint and having its axis disposed radially, and a slide mounted to slide in the said pivot at an angle to the axis thereof, the said slide having an opening therethrough and the outer end of the flexible coupling member slidingly extending through the said slide opening.

WILLIAM J. FRANCKE.